UNITED STATES PATENT OFFICE.

JAMES H. GRAVELL, OF NEW YORK, N. Y.

CLEANING METALS.

1,268,237.  Specification of Letters Patent.  Patented June 4, 1918.

No Drawing.  Application filed August 21, 1917. Serial No. 187,470.

*To all whom it may concern:*

Be it known that I, JAMES H. GRAVELL, a citizen of the United States, and a resident of New York city, in the county of New York and State of New York, have invented certain new and useful Improvements in Cleaning Metals, (Case No. 20,) of which the following is a specification.

This invention relates to cleaning of metals and is applicable to cleaning or preparing metals for painting. Although commercial metals may be cleaned to advantage according to the invention, yet the invention is especially useful for preparing iron and steel for painting.

The principal object of the invention is to provide a complete cleaning process for metal.

Owing to the fact that iron and steel are prone to rust under the paint, due to foreign substances on the surface over which the paint is applied, it is necessary to remove foreign substances, such as oil, dirt, grease, acids, soldering solutions and the like, before the application of the paint. Many methods are employed for this purpose at the present time, among which is the so-called deoxidin process, which consists in treating the steel with an admixture of alcohol and phosphoric acid. The use of this admixture of alcohol and phosphoric acid has proved highly satisfactory, except in some cases where the metal has been previously treated with strong acids of which a considerable amount has been allowed to remain on the surface.

I have discovered, however, that a small amount of calcium phosphate, in the presence of phosphoric acid, combines with such strong acids, forming phosphoric acid, thus destroying or neutralizing the strong acids, leaving behind harmless salts. The phosphoric acid formed, has of course no objectionable action on the metal and simply serves to reinforce the phosphoric acid already present. Although exact proportions of the constituents is not essential, I have found that substantially the following quantities produce a satisfactory result:

Phosphoric acid _____ 1 gallon
Calcium phosphate _____ ½ pound
Alcohol _____ 4 gallons The resultant admixture is thick and cloudy and is not free flowing, being difficult to remove from bottles and barrels and is not suitable for spraying. This property is due to the fact that the calcium phosphate is not soluble in an alcoholic admixture of phosphoric acid and is of course objectionable where a free flowing liquid without suspended material is required.

I have found, however, that sufficient of the calcium phosphate can be incorporated with the admixture of alcohol and phosphoric acid, to produce a clear, free flowing admixture by the addition of water to the admixture,—the quantity of the calcium phosphate dissolved being proportional, to a great extent, to the amount of water added.

As the alcohol in the admixture of it and phosphoric acid assists the admixture in removing any oil which may happen to be present on the metal, care must be taken not to add sufficient water to prevent this action. By experiment I have discovered that the addition of one gallon of water to the above described admixture produces satisfactory results, although this amount may be varied to a great extent. The admixture now containing phosphoric acid, calcium phosphate, alcohol and water may be separated from the remaining undissolved calcium phosphate by filtering or other means.

Commercially I prefer to use denatured alcohol owing to its relative low cost, but it is quite evident, as the main object of the alcohol is to make the admixture act on an oily surface, I may substitute other substances, such as acetone, so long as they will impart this property to the admixture.

To clean metals, I apply my admixture to the metal by any suitable means, such as dipping, painting or spraying. I then allow sufficient time for it to thoroughly dry when the metal is clean and ready for painting. As the drying sometimes takes many days the time consumed in some cases is very objectionable and the process must be altered to be of service. When the time for drying is limited, I apply my cleaner, allow about ten minutes for it to act and then wash it off with water and allow the subject to which the cleaner was applied to thoroughly air dry, which requires about four hours. The drying time can be considerably shortened by using hot water or by wiping dry with an absorbent material, such as a rag or a chamois or by both.

As my cleaner not only removes, but also prevents rust, it can be used to advantage to prevent the rusting of clean and sandblasted iron and steel in transit, when it is necessary to transport such material over great distances. The metal on arriving at its destination may then be immediately painted, or if the surface has not sufficiently dried, it may be washed with water before the paint is applied, as has been already described.

As the whole theory of my cleaner is to supply calcium phosphate to the surface of the metal to destroy any strong acids that may happen to be present at the same time that the metal is being cleaned with an alcoholic solution of phosphoric acid, it is quite evident that it is within the scope of this invention to apply the two materials together as described or each may be applied separately,—that is the alcoholic solution may be applied first and then the calcium phosphate applied to the metal in the dry state or mixed with the proper amount of water. It is also evident to those skilled in the art that the chemical equivalent to calcium phosphate such as barium phosphate, magnesium phosphate and the like, may be used to secure the same results, but at greater expense. The concentration of the phosphoric acid used is, for example, to start with about 85%.

What I claim is:

1. A cleaning compound for steel consisting of an admixture of phosphoric acid, alcohol and calcium phosphate, substantially as described.

2. A cleaning compound for steel consisting of an admixture of phosphoric acid, alcohol and water and calcium phosphate, substantially as described.

3. The method of cleaning steel which consists in subjecting it to the action of phosphoric acid in the presence of calcium phosphate and a liquid, substantially as described.

4. The method of cleaning steel which consists in subjecting it to the action of an alcoholic solution of phosphoric acid in the presence of calcium phosphate, substantially as described.

5. The method of cleaning steel which consists in subjecting it to the action of phosphoric acid in the presence of calcium phosphate and alcohol and water, substantially as described.

JAMES H. GRAVELL.